Dec. 20, 1955  L. G. PLANT  2,727,351
SIDE DELIVERY RAKING ATTACHMENT FOR TRACTORS
Filed Feb. 15, 1955  3 Sheets-Sheet 1
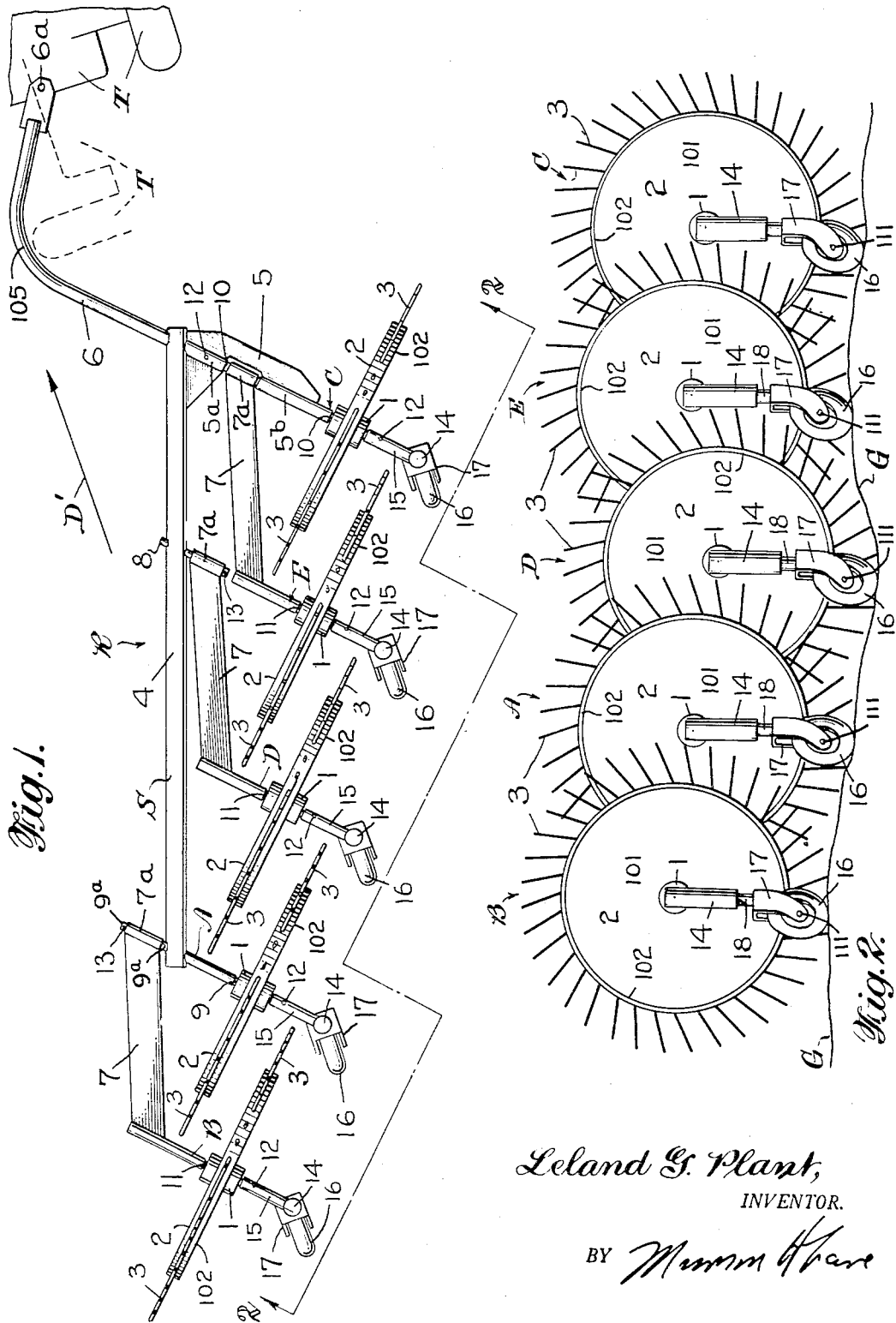
Leland G. Plant,
INVENTOR.

Dec. 20, 1955　　　　　L. G. PLANT　　　　　2,727,351
SIDE DELIVERY RAKING ATTACHMENT FOR TRACTORS
Filed Feb. 15, 1955　　　　　　　　　3 Sheets-Sheet 2
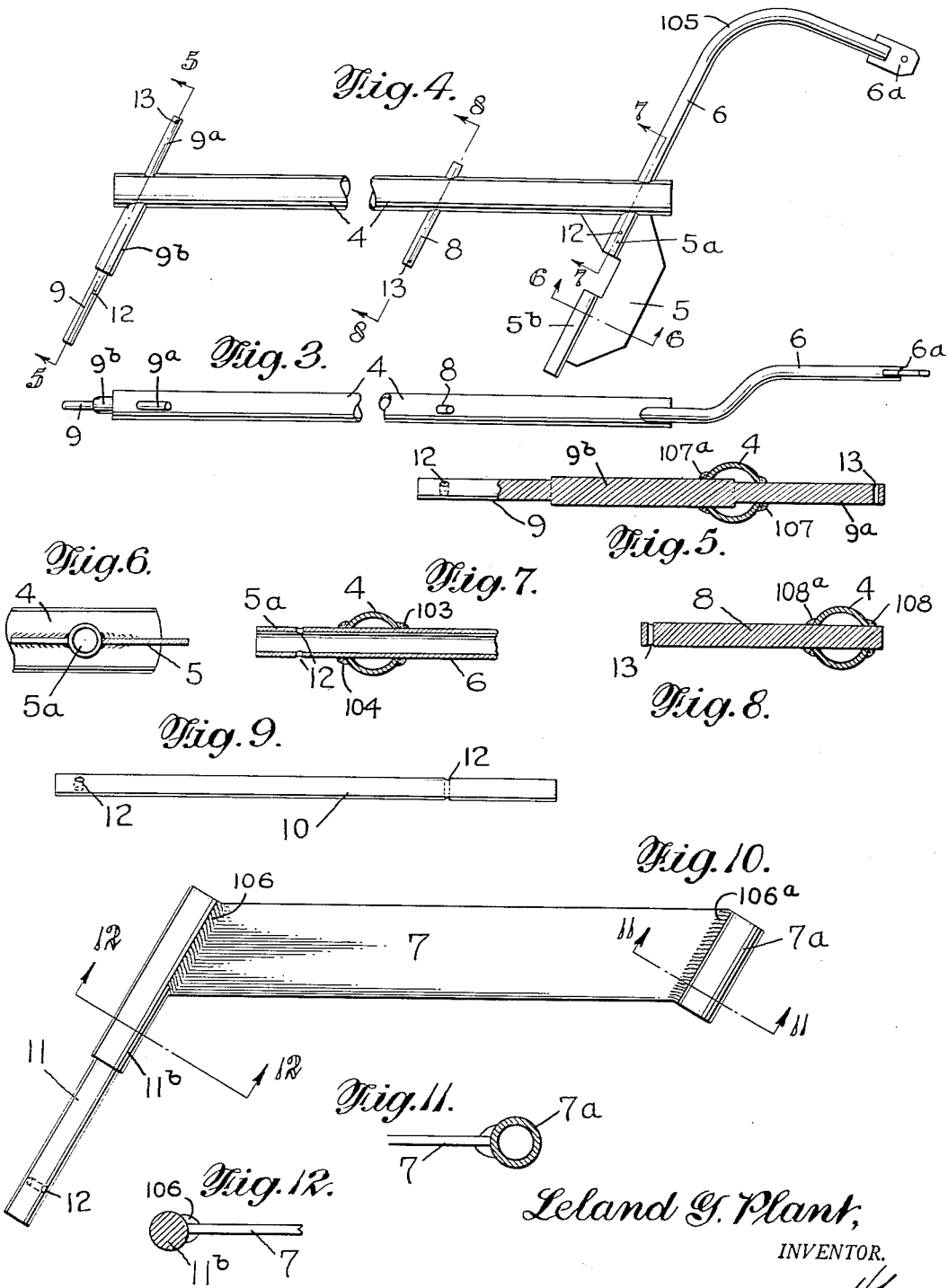
Leland G. Plant,
INVENTOR.

Dec. 20, 1955     L. G. PLANT     2,727,351
SIDE DELIVERY RAKING ATTACHMENT FOR TRACTORS
Filed Feb. 15, 1955     3 Sheets-Sheet 3
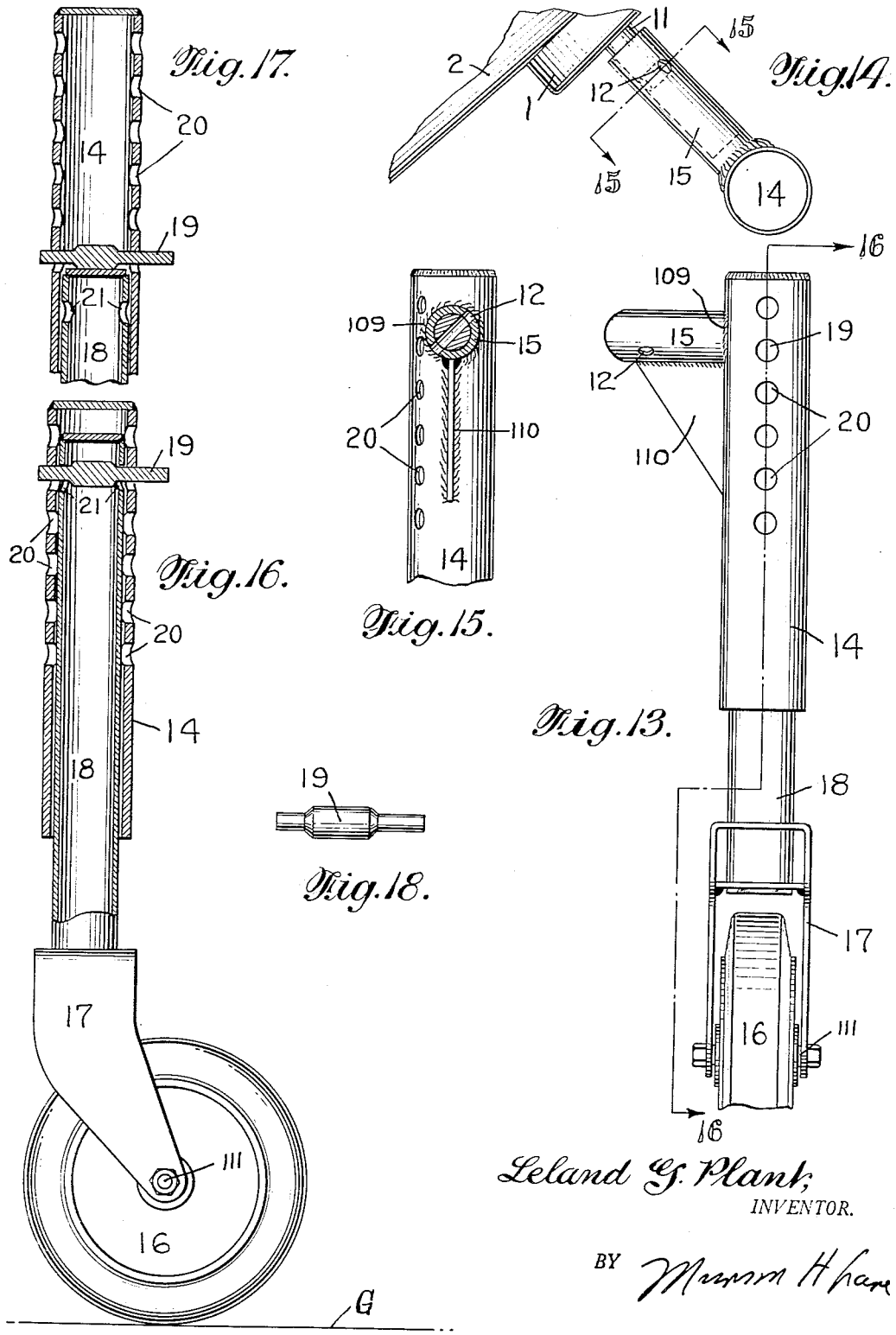
Leland G. Plant,
INVENTOR.

United States Patent Office 2,727,351
Patented Dec. 20, 1955

2,727,351
SIDE DELIVERY RAKING ATTACHMENT FOR TRACTORS

Leland G. Plant, Edenton, N. C.

Application February 15, 1955, Serial No. 488,330

4 Claims. (Cl. 56—377)

This invention relates to tractor attached raking wheels in distinction to the type of rotary side delivery rakes now commonly used in which the wheels are suspended from a carriage or cart-like mobile frame vehicle towed by a tractor, and is an improvement in the means employed for maintaining a desired spaced relation between each raking wheel in a group arranged in echelon and for stabilizing these wheels in upright positions as they are being drawn over the ground in a direction horizontally angular to the planes in which they rotate.

The present invention is in the nature of an improvement over the constructions disclosed in my Patent No. 2,670,588, dated March 2, 1954, entitled Rotary Side Delivery Rake.

The present improvement in its preferred embodiment comprises a raking attachment for tractors, which attachment has at least three raking wheel units each comprising tine equipped wheels positioned in substantially parallel planes disposed at an oblique angle to their direction of travel. These wheel units are connected either directly or indirectly to a rigid spine member which in turn is pivotally attachable through an extension and coupling at its forward end to a tractor, the spine extending rearwardly therefrom. The attachment includes a first axle shaft extending angularly rearwardly in a substantially horizontal plane from the rear of the spine member and rigid therewith, one of the raking wheels being journaled upon said first axle shaft. A rigid rib member is hinged axially at its forward end upon a pin projecting in a substantially horizontal plane from the spine member to which it is rigidly affixed, which pin may be an extension of the first axle shaft. Said rib member is provided with a second axle shaft member fabricated rigidly therewith upon its rearward end upon which a second raking wheel is journaled. The spine member is provided with a rigid branch member extending angularly and rearwardly in a substantially horizontal plane from the forward end thereof, said branch member having a third axle shaft extending rigidly from its extremity upon which a third raking wheel is journaled. Preferably the first, second and third axle shafts and the pin are all positioned in substantially parallel vertical planes. A pedestal is affixed in a substantially vertical position upon an extremity of each axle shaft rearwardly of the raking wheel journaled thereon, and a caster wheel is mounted in a supporting relation thereto at an adjustable distance below the pedestal. The spine member is positioned relative to the ground below it by three rigidly related points of support, one of which is the tractor to which it is attached, the other two points being casters supporting the pedestals to which the first and third axle shafts are rigidly affixed. Preferably the adjustable connections between each caster wheel and the raking wheel associated therewith include an inverted U-shaped bracket or horn in which the caster wheel is carried having a stem welded in an upright position with reference to the horn, the stem being insertable within the pedestal in a telescoping relation thereto, and both the stem and pedestal being of tubular structure and provided with oppositely disposed holes for the insertion of a pin either at a selected position through both the stem and pedestal walls as a device for locking one within the other and holding the caster wheel at a fixed angle relative to the pedestal, or through the pedestal walls above the stem as a thrust bearing for the stem so that it can rotate therein, permitting the caster wheel to swivel. In my improvement the aggregate weight of all parts of the attachment is distributable in a desired ratio partly upon the tractor at its point of attachment thereto and the remainder wholly upon its caster wheels. Additional raking units may be employed, and in the present embodiment of the invention five raking units in all are shown, but it will be obvious that a greater number may be employed if desired.

The invention will be more readily understood by reference to the accompanying drawings and the following detailed description in which a specific embodiment of the invention is set forth by way of illustration rather than by way of limitation.

In the drawings:

Fig. 1 is a plan view of the tractor attached raking wheels and attaching means therefor;

Fig. 2 is a side elevation of the above viewed from plane 2—2 in Fig. 1;

Fig. 3 is a side view of the main rigid attaching means or spine member shown in Fig. 1;

Fig. 4 is a plan view of the spine member shown in Fig. 1;

Fig. 5 is a section viewed in plane 5—5 of Fig. 4;
Fig. 6 is a section viewed in plane 6—6 of Fig. 4;
Fig. 7 is a section viewed in plane 7—7 of Fig. 4;
Fig. 8 is a section viewed in plane 8—8 of Fig. 4;
Fig. 9 is an elevation of one of the wheel shaft members;
Fig. 10 is an enlarged plan view of one of the rib members with a wheel shaft shown welded thereto;
Fig. 11 is a section viewed in plane 11—11 of Fig. 10;
Fig. 12 is a section viewed in plane 12—12 of Fig. 10;
Fig. 13 is an enlarged elevation of a pedestal, caster wheel and connecting parts;
Fig. 14 is a plan view of the pedestal showing its attachment to a wheel axle shaft;
Fig. 15 is a fragmentary sectional elevation viewed from plane 15—15 of Fig. 14;
Fig. 16 is a sectional elevation of the caster wheel with its horn and stem locked by a connecting pin in the pedestal as viewed from plane 16—16 of Fig. 13;
Fig. 17 is a sectional elevation of the upper part of the pedestal of Fig. 16 showing the stem free to rotate, thus permitting the caster wheel to swivel; and
Fig. 18 is an elevation of the connecting pin shown sectionally in Figs. 16 and 17.

Referring to the drawings, R denotes generally a tractor attached raking assembly or attachment comprising three or more raking wheel assemblies or units, herein shown as five in number and generally designated by the reference letters A, B, C, D and E, each unit comprising a tine equipped wheel mounted on a hub carried by an axle shaft, each unit being connected either directly or indirectly to a rigid spine member S which is connected at its forward end through a suitable angularly disposed spine extension member to a coupling pivotally attachable to the draw bar of a suitable tractor vehicle fragmentarily indicated at T, the full lines in Fig. 1 indicating the normal towing position when the vehicle is moved in the direction indicated by the arrow D' over a ground surface indicated at G in Figs. 2 and 16, while the dotted line portion indicates the tractor in its relation to the raking assembly R in the extreme position for turning. As will be apparent, all the tine equipped raking wheel units A, B, C, D and E move in substantially parallel planes each disposed at an oblique angle with reference to their direction of travel D' when towed by the tractor vehicle.

As shown, the axle shaft of the first raking wheel assembly or unit A extends laterally in a substantially horizontal plane and at an oblique angle from the rear of the spine member, while the axle shaft of the second wheel assembly B is indirectly connected to the spine member through a suitable rigid rib member which is hinged axially at its forward end upon a pin projecting angularly forwardly in a substantially horizontal plane from the rear of the spine member and herein shown as an extension of the axle shaft of the wheel assembly A and projecting in the opposite direction therefrom. The third wheel assembly or unit C is shown as connected at the opposite end of the spine member S from the wheel units A and B by means of a rigid branch member or brace extending laterally at an oblique angle from the spine member and herein shown as formed integral with the shaft extension member whose forward end is coupled to the tractor.

In addition to the wheel units or assemblies A, B and C attached at the rear and front portions respectively of the spine member any desired number of additional wheel units may be attached directly or indirectly to the spine member, which may be made of any desired length. Two such additional wheel units D and E are herein shown, the unit D being shown as connected to the spine member S through a rib member rigidly secured to the wheel axle shaft of the unit D at its rear end, and pivotally connected at its forward end to a hinge pin secured to the spine member, while the axle shaft of the wheel unit E is shown as also connected through a suitable rib member with the upper end of the axle of the wheel unit C and thus indirectly with the spine member S.

Each of the wheel units A, B and C includes a ground engaging caster wheel connected to the wheel axle shaft through suitable connections including a vertical pedestal or the like which is vertically adjustable with reference to the caster wheel whereby the vertical position of the raking wheel may be adjusted as desired.

Having described in general terms the principal parts of the raking assembly in their relation to one another the individual parts and connections will now be described in greater detail for the purpose of illustration, the same reference numerals being employed to designate like parts in the various figures of the drawings, it being understood that such detailed description is intended by way of illustration only rather than by way of limitation, as numerous modifications and variations may be resorted to within the scope of the appended claims without departing from the spirit of the invention.

Referring to the drawings in detail, each of the raking wheel units or assemblies A, B, C, D and E includes a raking wheel hub 1 which carries the raking wheel 2, herein shown as comprising a raking wheel web 101 and a rim 102, said rim having suitable raking tines 3 applied thereto. As previously pointed out, all of the raking wheel units are carried directly or indirectly by a spine S, herein shown as comprising a hollow cylindrical rod portion 4 having a web-like lateral branch 5 extending in a generally rearwardly direction from the forward end of the rod 4 and welded thereto and having a pair of spaced aligned tubular socket members 5ª and 5ᵇ carried thereby. The spine S also includes an extension 6 of the socket member 5ª which extends through the hollow spine member or rod 4 and is welded thereto as indicated at 103 and 104 in Fig. 7, and inclines angularly forwardly from the front of the rod 4, said extension being provided with a curved neck portion 105 which is provided at its end with a hinged coupler member 6ª, thereby connecting the spine S and the parts carried thereby to the tractor T. As will be noted, the tubular socket member 5ª is a continuation of the extension 6 and is welded to the spine rod 4 as indicated at 104.

For individually attaching certain of the raking units, namely B, D and E, to the spine S rib members 7 are provided as shown in detail in Figs. 10, 11 and 12, each rib being shown as secured at one end by welding as at 106 to an enlarged portion 11ᵇ of an axle member 11, over which fits hub 1 of its respective raking unit, the lower end of the axle member being provided with a suitable opening for receipt of a cotter pin or other suitable fastening member (not shown). The end of each rib opposite the axle member 11 is provided with a suitable socket member 7ª secured thereto as by welding 106ª.

As shown in Figs. 1, 3, 4 and 5 an axle member 9 is provided to receive the hub 1 of the wheel unit A. This axle member 9 is shown as having an enlarged portion 9ᵇ which extends angularly into the rear portion of the hollow spine rod member 4 and is provided with a projecting portion or pin 9ª on the opposite side of the rod member which is adapted to receive the socket 7ª of the rib 7 which carries the raking unit B in a manner previously described. The pin 9ª is welded to the rod 4 as indicated at 107, and the enlarged portion 9ᵇ is likewise welded to the rod as indicated at 107ª in Fig. 5.

The wheel unit D is similarly attached to the spine rod member 4 through a rib 7 and socket 7ª by means of a pin 8 welded to the rod 4 at 108 and 108ª as shown in detail in Fig. 8 of the drawings.

The wheel unit C is provided with an axle shaft 10 shown in detail in Fig. 9 which receives the hub 10 of the wheel unit and extends upwardly into and through the tubular socket 5ᵇ carried by the branch member 5, and through socket 7ª of the rib member 7 which carries the axle 11 of the wheel unit E, and thence into socket 7ª, suitable fastening means such as bolts, cotter pins or the like being provided to secure the respective parts together in operative relation to one another, suitable apertures being provided in the respective parts for holding the same together. In the various figures holes through the shafts and sockets for such fastening means are indicated at 12, and holes in the pins 8 and 9ª are indicated at 13.

For adjustably supporting the various raking wheel units at the desired height above the ground suitable supporting means in the form of caster wheel units and brackets therefore are provided, the details of which are best shown in Figs. 13 to 18, inclusive. Since the supporting means are or may be identical for each of the raking units a description of one will apply to all and the same reference numerals will be employed for the parts of each caster wheel unit. As shown, each such unit comprises an upright tubular pedestal member or hollow cap 14 which is provided with a laterally extending tubular bracket or socket 15 welded thereto and adapted to receive one of the axle members of the corresponding raking unit, the socket being suitably apertured to receive a conventional fastening device (not shown) such as a bolt, cotter pin or the like. As shown, the socket 15 is welded to the pedestal 14 as indicated at 109 and is shown as provided with a supporting web portion 110. The caster wheel unit also includes a caster wheel 16 whose axle 111 is mounted in an inverted U-shaped bracket or horn 17 having secured thereto an upwardly extending stem portion 18 which telescopically fits within the socket or pedestal 14. A cross pin 19, shown in detail in Fig. 18, is provided to coact with openings 20 and 21 in the pedestal 14 and the stem 19 respectively, which pin serves to lock the caster wheel 16 to the pedestal 14 when in the position shown in Fig. 16, or to permit swiveling of the caster when the pin is in the position shown in Fig. 17.

As is apparent from the drawings and from the preceding description each raking wheel hub 1 is individually journaled on axle shafts 9, 10 or 11, one end of each shaft being rigidly affixed to one of the pedestals 14, by insertion in the tubular bracket 15 gusseted and welded to the pedestal wall from which it projects axially at substantially a right angle. Each of the pedestals is supported in an upright position at an adjustable height above a caster wheel 16 by means of the horn or bracket 17 in which the caster wheel is journaled and the stem 18 extending upwardly from the horn to which it is welded and into the tubular pedestal 14. The height of said stem within this pedestal is fixed by the pin 19 inserted through holes 20 in the pedestal wall. As previously pointed out the pin 19 may also be inserted through holes 21 in the stem that register with holes 20, so as to lock the stem at a fixed height within the pedestal and prevent it from rotating therein, or it may be inserted through holes 20 above the stem 18, thus serving as a thrust bearing for the stem and positioning its height within the pedestal, while free to rotate therein and permit the caster wheel to swivel.

In an articulated system of members as above described the means I have heretofore principally relied on for maintaining a desired spaced relation between each of the raking wheels are spacer bars pinned at both ends to pairs of adjacent pedestals such as here described, positioned rearwardly of adjacent raking wheels; the stability of these pedestals as they rise and fall, one relative to the other while traversing uneven ground, being maintained by employing two spacer bars between pairs of pedestals, either rigidly cross braced or held in parallel by the spacer bars pinned thereto. The present invention dispenses with all such spacer bars and relies on hinging each rib 7 by its socket 7ª to a pin projecting rigidly from the spine 4 in such manner as to maintain the rib at a fixed angle to the spine (viewed in a substantially horizontal plane) as this rib swings up and down relative to the spine.

Upright stability of the articulated assembly herein described is accomplished in the present invention by introducing a branch member 5 projecting rigidly from the spine 4 in a substantially horizontal plane. This branch member may either terminate in one of the brackets 15 projecting rigidly from a pedestal 14, or, as here illustrated, it may have tubular sockets 5ª and 5ᵇ into which the extension shaft 10 is inserted in such manner as to provide a pin on which one of the rib members is hinged by its socket 7ª. Also, by projecting beyond the outer end of socket 5ᵇ on branch 5, the shaft 10 may be utilized as an axle on which one of the raking wheel hubs 1 can be journaled and the extremity of shaft 10 beyond the wheel hub affixed to one of the brackets 15 projecting rigidly from a pedestal 14.

The drawings show holes 12 through shaft members 9, 10 and 11 and the tubular sockets 5ª and brackets 15 in which they are inserted, so positioned that a bolt may be threaded through both the shaft and tubular wall as a means of rigidly securing the one within the other in a desired fixed relation. Holes 13 are shown at one extremity of each hinge pin 8 and 9ª, through which cotter keys may be inserted as a means for preventing the tubular sockets 7ª from slipping off the pins 8 on which they are hinged.

The raking wheels used in my invention as shown have tines applied to a rim surrounding a spoked or solid web 2 mounted on the wheel hub. As attached to a tractor in my articulated assembly the raking wheels are drawn forward over the ground surface G in a direction D', the axle shafts on which these wheels rotate being generally disposed in parallel, ordinarily at an angle of approximately 45 degrees to the direction D'. But as the raking wheels are thus drawn forward by the tractor to which they are attached in this articulated arrangement they are individually free to rise and fall one independently of the other while remaining grouped in echelon, each wheel being held firmly at a height above the ground selectively fixed by adjustment of a pin 19 within a pedestal 14. This is in contrast to vehicular type rakes in which the raking wheels are suspended from a carriage or cart-like mobile frame to which they are attached by crank shaped axle shafts permitting them to rise and fall independently in relation to the frame but necessitating counterweight or balancing springs by which some part of the wheel weight is suspended from the frame.

In these vehicular type rakes of the prior art the desired altitude of the raking wheels in relation to the ground can only be approximated. If insufficiently balanced these wheels dig into the ground surface, causing tine breakage and foreign matter to be raked into the hay, whereas if over balanced the raking wheels rise and ride over the hay in heavy forage. In rakes having a carriage-like mobile frame from which the raking wheels are suspended three supporting wheels, one of which is adjustable for directional control, are usually relied on for stability of the vehicle, and where the mobile frame is a cart-like structure with two supporting wheels its attachment to the tractor is relied on for its stability and directional control. In the present invention two of the caster wheels, each independently supporting an end of a raking wheel axle shaft, one of which is an extension to novel branch member 5, together with an attachment of the spine member 4 to the tractor through an extension 6 and coupling 6ª resting upon the tractor drawbar, provide three rigidly related points on which stability of the articulated assembly depends.

I claim:

1. In a raking attachment for tractors having at least three tine equipped wheel units positioned in substantially parallel planes disposed at an oblique angle to their direction of travel; a rigid spine member having an extension and coupling at its forward end to a tractor for pivotal attachment thereto and extending rearwardly therefrom; one raking wheel unit comprising a first axle shaft extending in a substantially horizontal plane from the rear of said spine member and rigid therewith, a raking wheel journaled upon said first axle shaft, a rigid rib member hinged axially at its forward end upon a pin projecting in a substantially horizontal plane from the spine member to which it is rigidly affixed and having an axle shaft member of a second raking wheel unit fabricated rigidly upon its rearward end, a second raking wheel journaled upon said second axle shaft, a rigid branch member extending in a substantially horizontal plane from the forward end of said spine to which it is rigidly fabricated and having an axle shaft of a third raking wheel unit extending rigidly from its extremity with a third raking wheel journaled thereon; the first, second and third axle shafts and said pin all being positioned in substantially parallel vertical planes, a pedestal affixed in a substantially vertical position upon the extremity of each axle shaft rearwardly of the raking wheel journaled thereon, and a caster wheel mounted in a supporting relation thereto at an adjustable distance below the pedestal.

2. In a raking attachment for tractors having at least three tine equipped wheel units positioned in substantially parallel planes disposed at an oblique angle to their direction of travel; a rigid spine member having an extension and coupling at its forward end to a tractor for pivotal attachment thereto and extending rearwardly therefrom; one raking wheel unit comprising a first axle shaft extending in a substantially horizontal plane from the rear of said spine member and rigid therewith, a raking wheel journaled upon said first axle shaft, a rigid rib member hinged axially at its forward end upon a pin projecting in a substantially horizontal plane from the spine member to which it is rigidly affixed and having an axle shaft member of a second raking wheel unit fabricated rigidly upon its rearward end, a second raking wheel journaled upon said second axle shaft, a rigid branch member extending in a substantially horizontal plane from the forward end of said spine to which it is rigidly fabricated and having an axle shaft of a third raking wheel unit extending rigidly from its extremity with a third raking wheel journaled thereon; the first, second and third axle shafts and said pin all being positioned in substantially parallel vertical planes, a pedestal affixed in a substantially vertical position upon the extremity of each axle shaft rearwardly of the raking wheel journaled thereon, and a caster wheel mounted in a supporting relation thereto at an adjustable distance below the pedestal, the spin member being positioned relative to the ground below it by three rigidly related points of support, one of which is the tractor to which attached and the other two points being casters supporting the pedestals to which said first and third axle shafts are rigidly affixed.

3. In a raking attachment for tractors having at least three tine equipped wheels positioned in substantially parallel planes disposed at an oblique angle to their direction of travel; a rigid spine member pivotably attachable through an extension and coupling at its forward end to a tractor and extending rearwardly therefrom, a first axle shaft extending in a substantially horizontal plane from the rear of said spine member and rigid therewith, one of said raking wheels being journaled upon said first axle shaft, a rigid rib member hinged axially at its forward end upon a pin projecting in a substantially horizontal plane from the spine member to which it is rigidly affixed and having a second axle shaft member fabricated rigidly upon its rearward end, a second raking wheel being journaled upon said second axle shaft, a rigid branch member extending in a substantially horizontal plane from the forward end of said spine to which it is rigidly fabricated and having a third axle shaft extending rigidly from its extremity with a third raking wheel journaled thereon; the first, second and third axle shafts and said pin all being positioned in substantially parallel vertical planes, a pedestal affixed in a substantially vertical position upon the extremity of each axle shaft rearwardly of the raking wheel journaled thereon, and a caster wheel mounted in a supporting relation thereto; said support including a horn in which the caster wheel is mounted, a stem welded in an upright position to the horn, said stem being insertable within the pedestal in a telescoping relation thereto, both the stem and pedestal being of tubular structure and provided with oppositely disposed holes for the insertion of a pin either at a selected position through both the stem and pedestal walls as a device for locking one within the other and holding the caster wheel at a fixed angle relative to the pedestal, or through the pedestal walls above the stem as a thrust bearing for said stem so it can rotate therein, permitting the caster wheel to swivel.

4. A raking attachment for tractors as in claim 3, wherein the aggregate weight of all parts is distributable in a desired ratio partly upon the tractor at its point of attachment thereto and the remainder wholly upon its caster wheels.

No references cited.